Feb. 4, 1941.   F. BIEDERMANN   2,230,637
METHOD OF MAKING BEARING BUSHINGS
Filed Nov. 16, 1938
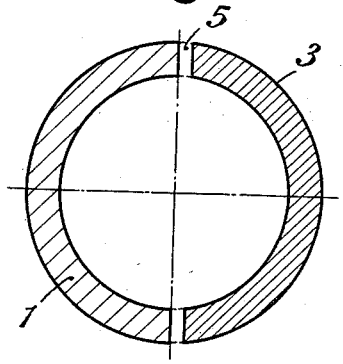
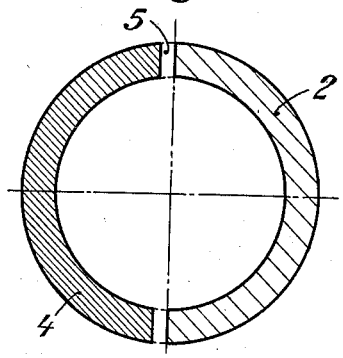
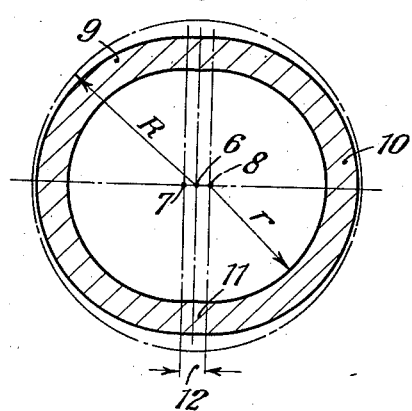
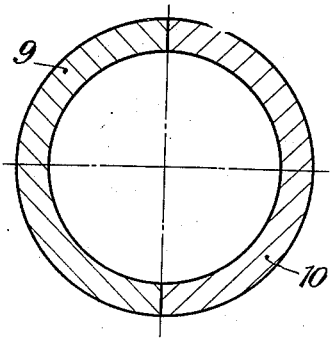
F. Biedermann
Inventor
By Glascock Downing & Seebold
Attys.

Patented Feb. 4, 1941

2,230,637

UNITED STATES PATENT OFFICE 2,230,637

METHOD OF MAKING BEARING BUSHINGS

Felix Biedermann, Berlin-Weissensee, Germany, assignor to Admos Bleibronze Dr. Springorum & Co. Kom.-Ges., Berlin-Oberschone weide, Germany Application November 16, 1938, Serial No. 240,849
In Germany December 15, 1937

1 Claim. (Cl. 29—149.5)

My invention relates to bearings, and more particularly to bearings with an antifriction lining, such as are used for shafts revolving at very high speed in airplane and other engines.

The following method is usually employed for making bearings of this type:

A tubular blank of ferrous metal, i. e., of cast iron, wrought iron, or steel, is lined on its inner and/or outer side with an antifriction metal, preferably lead bronze, containing 60 to 80 parts of copper, and 40 to 20 parts of lead. The lining is preferably applied in a permanent mold, on the inner or outer side of the blank, or on both sides, as required, and the blank is quenched immediately after the casting of the lining to prevent segregation of the lead. The blank is then divided longitudinally, and its two halves are machined.

It is obvious that the two halves of a bearing must be full semi-cylinders, and it is as obvious that only one of the halves can fulfill this condition, since part of the material is changed into sawing chips when the blank is divided, and there must be a machining allowance on that half which is to be used. It follows, therefore, that in this method the waste is excessive, since each blank supplies but one semi-cylinder, and the remainder of the blank which is almost as large as the semi-cylinder, has only scrap value, apart from the necessity of recovering the expensive lining from the part going to waste. It is obvious that under these conditions the price of bearings is high and the demand of material is beyond proportion.

It is an object of my invention to provide a method in which these drawbacks are eliminated and two fully semi-cylindrical and perfectly true bearing halves are produced from a hollow cylindrical blank.

To this end, I shape the blank into two hollow semi-cylinders whose axes are arranged in equidistant relation at opposite sides of the blank's axis, and remove the material which is between the parallel central plane of the two semi-cylinders.

The inside and outside diameters of the blank are somewhat in excess of the sum of the corresponding radii of the finished bearing and the extra material thus obtained represents the material which is changed into chips, and the machining allowance on the mating ends of the semi-cylinders obtained.

In the accompanying drawing, a bearing made in conformity with the old method is illustrated by way of explanation, and a bearing made according to my invention is illustrated by way of example.

In the drawing

Figs. 1 and 2 are cross-sections of divided blanks.

Fig. 3 is a cross-section of a blank made in conformity with my method.

Fig. 4 is a cross-section of the finished bearing obtained.

In the old method, the hollow cylindrical blank 10 is turned to cylindrical shape on a lathe before the lining is made, as shown in Figs. 1 and 2. When this blank is divided by removing the material at 5, it is obvious that only one of the halves, that is, the half 1 in Fig. 1 and the half 2 in Fig. 2 is a perfect semi-cylinder while the other halves, 3 in Fig. 1 and 4 in Fig. 2, are minus the material removed, and minus the machining allowance, as indicated, much exaggerated, at 5. Only the semi-cylinders 1 and 2 are suitable for making up a bearing together, and the parts 3 and 4 go to waste.

According to the invention, the blank is not turned to cylindrical shape. The blank as shown in dot-and-dash lines in Fig. 3, is a cylinder whose axis is 6 and whose outside radius is R. This blank is turned to form the intermediate product illustrated in Fig. 3 which is defined by the intersection, in the plane of the axis 6, of two cylinders whose axes 7 and 8 are arranged in equi-distant relation at opposite sides of the blank axis 6, and whose radii are smaller than the corresponding radii of the blank for the distance 7—8. By these means, a perfect semi-cylinder 9 is formed about the axis 7, and another perfect semi-cylinder 10 is formed about the axis 8. The letter r designates the inside radius of the two cylinders. The two semi-cylinders 9 and 10 intersect in the plane of the blank axis 6 and form intermediate portions 11 whose width 12 is equal to the distance 7—8. The intermediate portions 11 are removed by sawing, and the two complete and true semi-cylinders are abutted as shown in Fig. 4 to form a circular bearing. An antifriction lining, not shown, may be provided as described.

It will be understood that in the manner described, waste is reduced to a minimum, and it is not necessary to discard practically one-half of each blank, as in the old method.

I claim:

In a method of making bushings for use in compound bearings, the steps of casting a hollow tube-like cylindrical member, turning said member about two centers of rotation each of which is situated outside the longitudinal middle axis of said member to form two hollow semi-cylindrical members connected together by intermediate material, the axes of the semi-cylindrical members being arranged in equidistant relation at opposite sides of the original axis of said hollow member, lining said member, consisting of the two semi-cylindrical parts connected by the intermediate material, with antifriction material, and removing the material intermediate said hollow semi-cylindrical members to obtain two equal semi-cylindrical members forming together the bushings for use in a compound bearing.

FELIX BIEDERMANN.